(12) United States Patent
Nishide

(10) Patent No.: US 7,999,539 B2
(45) Date of Patent: Aug. 16, 2011

(54) PROXIMITY SENSOR

(75) Inventor: Harutomi Nishide, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 304 days.

(21) Appl. No.: 12/194,847

(22) Filed: Aug. 20, 2008

(65) Prior Publication Data

US 2009/0051356 A1 Feb. 26, 2009

(30) Foreign Application Priority Data

Aug. 22, 2007 (JP) ................................. 2007-215876

(51) Int. Cl.
*G01B 7/14* (2006.01)
*G01R 33/00* (2006.01)

(52) U.S. Cl. .............. 324/207.26; 324/207.22; 324/228; 324/262

(58) Field of Classification Search ............. 324/207.26, 324/207.2, 228, 262
See application file for complete search history.

(56) References Cited

U.S. PATENT DOCUMENTS 6,043,646 A 3/2000 Jansseune
7,320,817 B2 * 1/2008 Kotani et al. ................ 428/34.1

FOREIGN PATENT DOCUMENTS

| JP | 2-272378 | 11/1990 |
| JP | 9-105603 | 4/1997 |
| JP | 9-511357 | 11/1997 |
| JP | 2006-281813 | 10/2006 |

* cited by examiner

*Primary Examiner* — Reena Aurora
(74) *Attorney, Agent, or Firm* — Rankin, Hill & Clark LLP

(57) ABSTRACT

In a proximity sensor 20 for detecting the proximity of a member to be detected 8 having a magnet or a magnetic material using a magnetic detection element 26, there are provided elastic members 33 for elastically energizing the magnetic detection element 26 toward the detection surface 26*a* thereof.

17 Claims, 8 Drawing Sheets

PROXIMITY SENSOR

The present invention claims priority from Japanese Patent Application No. 2007-215876 filed on Aug. 22, 2007, the entire content of which is incorporated herein by reference.

BACKGROUND OF INVENTION

1. Field of the Invention

The present invention relates to a proximity sensor.

2. Description of the Related Art

As a position detecting apparatus for detecting the slide position of a seat for use in a vehicle, there is known an apparatus which uses a proximity sensor of a magnetic field detect type (see, JP-A-2006-281813 and JP-A-9-511357).

According to this position detect apparatus a member to be detected made of a magnetic member is provided on a lower rail to be fixedly installed on the floor of a vehicle body. A proximity sensor including a magnetic field generating portion (a permanent magnet) and a detect portion (a Hall IC) is provided on an upper rail formed integrally with the vehicle seat.

In this position detect apparatus, when the proximity sensor is moved according to the sliding movement of the vehicle seat, the magnetic field of the magnetic field generating portion to be detected by the detect portion is varied according to the position relationship between the proximity sensor and the member to be detected, and the slide position of the seat is detected based on the thus varied magnetic field.

However, in the above-mentioned related proximity sensor, when the relative position relationship between the housing of the proximity sensor and the detect portion thereof is shifted, the magnetic field of the magnetic field generating portion may be varied to thereby worsen the detect precision of the proximity sensor. In other words, when a distance from the detect portion of the proximity sensor to the member to be detected varies with age, there is a fear that the amount of variation of the magnetic field may be varied to thereby vary the slide detect position of the seat.

SUMMARY OF INVENTION

In one or more embodiments of the invention, a proximity sensor which may enhance the detect precision thereof.

According to a first aspect of the invention, a proximity sensor is provided to detect a proximity of a detected object with a magnetic material, wherein an elastic member elastically applies a force to a magnetic detection element toward a detection surface of the magnetic detection element.

According to a second aspect of the invention, the proximity sensor is provided with a housing which stores the magnetic detection element, wherein the magnetic detection element is held by and between an inner surface of the housing and the elastic member.

According to a third aspect of the invention, the detection surface of the magnetic detection element and the non-detection surface of the magnetic detection element disposed opposed to the detection surface are arranged substantially parallel to each other, and a distance from the inner surface of the housing to the elastic member is set smaller than a dimension between the detection surface and the non-detection surface.

According to a fourth aspect of the invention, the elastic member is integrally formed with the housing for storing the magnetic detection element.

According to the first aspect of the invention, since the magnetic detection element may be applied a force toward the detection surface thereof using the elastic member, the distance between the detection surface of the magnetic detection element and the member to be detected may be maintained constant. This may provide an effect that the detect accuracy of the proximity sensor may be enhanced.

According to the second aspect of the invention, since the magnetic detection element may be fixed between the elastic member and the inner surface of the housing, the distance between the detection surface of the magnetic detection element and the member to be detected may be maintained constant more positively. Therefore, since the relative position between the housing and magnetic detection element may be kept stationary, there may be provided an effect that the detect accuracy of the proximity sensor may be enhanced.

According to the third aspect of the invention, since, when mounting the magnetic detection element into the housing, the magnetic detection element is mounted in such a manner that it is pushed into between the inner surface of the housing and elastic member, the elastic member is allowed to function positively, thereby being able to hold the magnetic detection element by and between the inner surface of the housing and elastic member.

According to the fourth aspect of the invention, since the elastic member is also formed when forming the housing, there is provided an effect that the formation of the housing and elastic member may be carried out easily without taking time and labor.

Other aspects and advantages of the invention will be apparent from the following description and the appended claims.

DESCRIPTION OF EXEMPLARY EMBODIMENTS

Next, description will be given below of an embodiment of a proximity sensor according to the invention with reference to FIGS. 1 through 8.

FIGS. 1 through 8 respectively show a seat slide apparatus for use in a vehicle. This seat slide apparatus incorporates therein a seat position detecting apparatus 100 which is used to detect the back and forth slide position of a seat for use in the vehicle. The detect signal of the seat position detecting apparatus 100 is used to control, for example, the developing output of an air bag or the ignition timing of an inflator according to the back and forth slide position of the seat.

Figure 1:
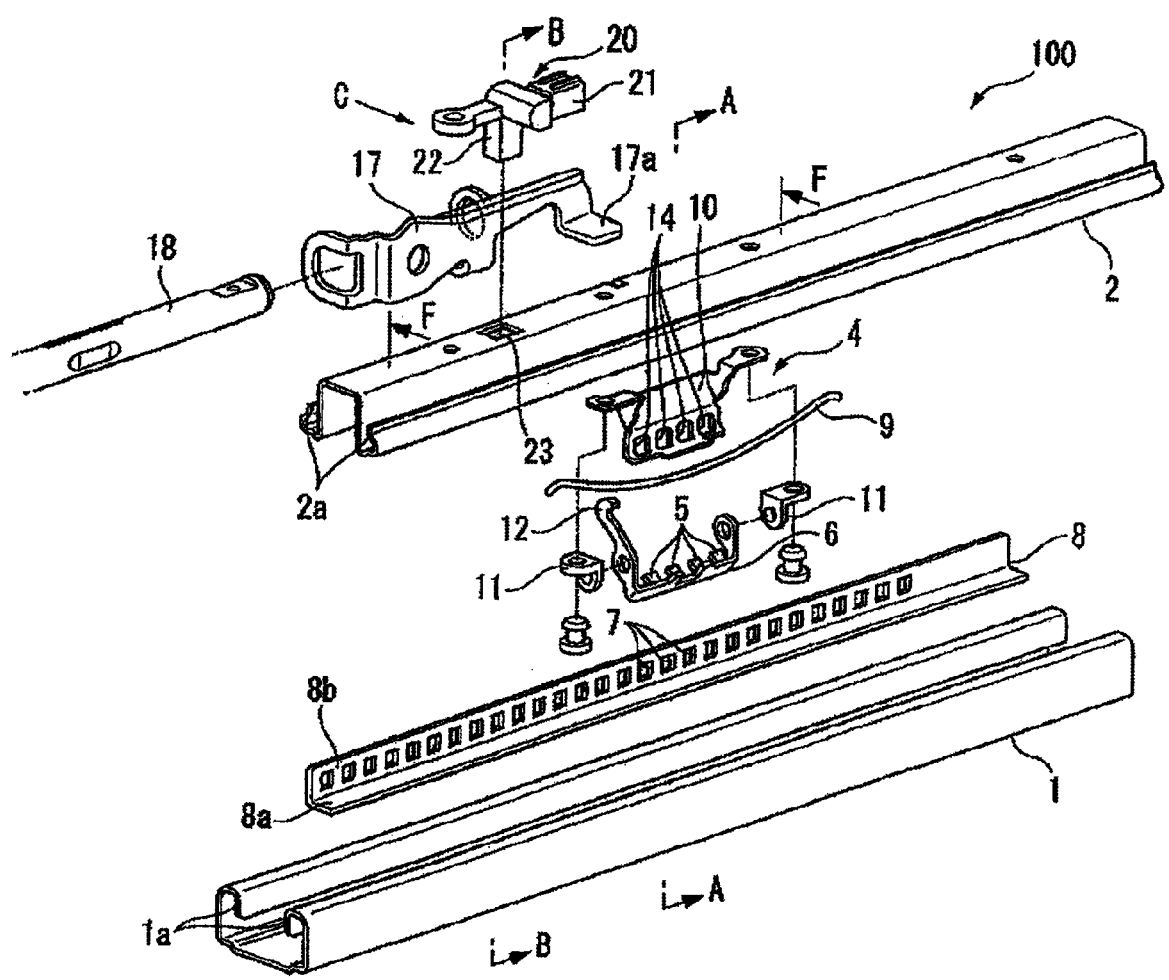
FIG. 1 is an exploded perspective view of a seat position detecting apparatus according to an embodiment of the invention.

As shown in FIG. 1, the seat slide apparatus includes a lower rail to be fixed to and installed on the floor of the vehicle and an upper rail 2 to be mounted on the lower surface of the seat, while the lower and upper rails 1 and 2 are assembled such that they may be slid in the longitudinal direction (in the back and forth direction of a vehicle body) through sliding members such as rollers (not shown).

The lower rail 1 includes two downward facing bent portions 1*a* which are respectively disposed on the upper ends of the two side walls of the substantially U-shaped basic section of the lower rail 1 with the upper portion thereof opened and are bent downward inwardly in the width direction of the lower rail 1. The neighboring portions of the two end portions in the longitudinal direction of the bottom wall of the lower rail 1 are fastened and fixed to the floor of the vehicle. On the other hand, the upper rail 2 includes two downward facing bent portions 2*a* which are respectively disposed on the lower ends of the two side walls of the substantially U-shaped basic section of the upper rail 2 with the lower portion thereof opened and are bent upward outwardly in the width direction of the upper rail 2. The upper rail 2 may be fitted into the opening portion of the lower rail 1, while the two upward facing bent portions 2*a* may be disposed opposed to the inner surfaces of the downward facing bent portions 1*a* of the lower rail 1.

Also, between the upper rail 2 and lower rail 1, there is interposed a lock mechanism 4 which is used to fix the upper rail 2 at an arbitrary slide position. The lock mechanism 4 includes:

a latch lever 6 which is formed in a substantially U-like shape, is swingably supported on the upper rail 2, and includes a plurality of lock pawls 5;

a lock plate 8 which is connected to the lower rail 1 and includes a plurality of fit holes 7 for engaging with the lock pawls 5;

a rod-shaped spring 9 used to apply a force to the lock pawls 5 in the direction of the fit holes 7; and a pawl support plate 10 which, when locking the upper rail 2, may be engaged with the root portions of the lock pawls 5 on this side of the lock plate 8 to thereby support the lock pawls 5.

The rod-shaped spring 9 is structured such that the two end portions thereof are respectively supported on the upper wall of the upper rail 2 and the curved central portion thereof may energize the latch lever 6 in the direction of the lock plate 8.

The latch lever 6 is mounted on the inner surface of the upper wall of the upper rail 2 such that it may be rotated through two shaft support members 11 and, on one end of the latch lever 6, there is provided an input arm 12 integrally therewith which is used to take in an operation force from outside.

The lock plate 8 extends along the longitudinal direction of the lower rail 1 and is fixed to and installed on the inner bottom surface of the lower rail 1. The lock plate 8 is made of a magnetic metal (a magnetic member) in such a manner as to have a substantially L-like shape; the base wall 8*a* of the lock plate 8, which forms the bottom surface thereof, is connected to the width direction substantially central portion of the lower rail 1 by spot welding or by projection welding; and, on and from one end side of the base wall 8*a* in the width direction, there is provided a vertical wall 8*b*. In the vertical wall 8*b*, there are formed a plurality of fit holes 7 at regular intervals in the longitudinal direction, while the lock pawls 5 of the latch lever 6 may be fitted into the arbitrary ones of the fit holes 7.

Figure 2:
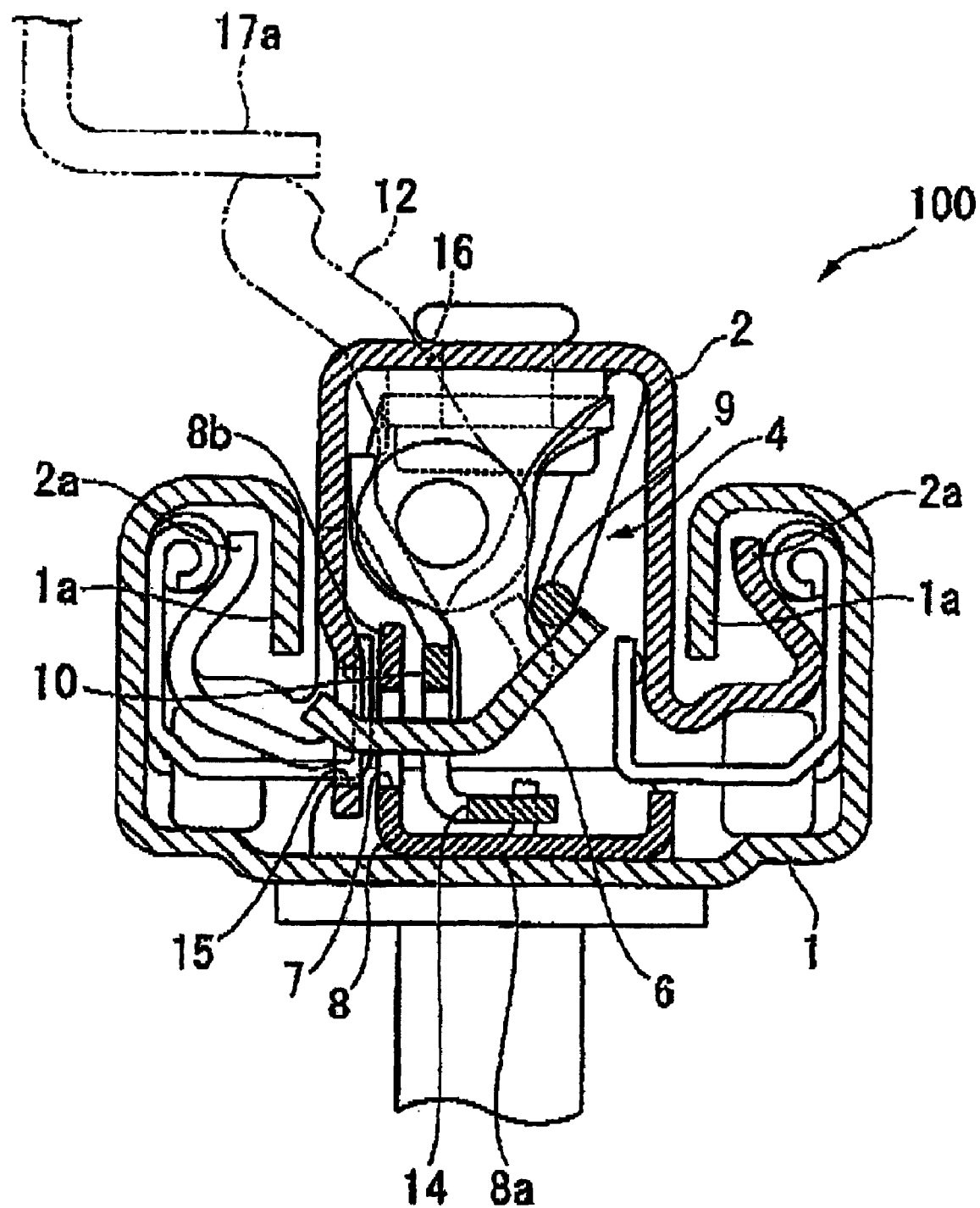
FIG. 2 is a section view taken along the A-A line shown in FIG. 1.

The pawl support plate 10 includes a plurality of support holes 14 into which the root portions of the lock pawls 5 of the latch lever 6 may be inserted and engaged, while the pawl support plate 10 is fixed to and installed on the lower surface of the upper wall of the upper rail 2. And, at the positions of one of side walls of the upper rail 2 that correspond to the support holes 14 of the pawl support plate 10, as shown in FIG. 2, there are formed support holes 15 into which the leading end portions of the lock pawls 5 of the latch lever 6 may be inserted and engaged. The pawl support holes 14 and 15 of the pawl support plate 10 and upper rail 2, when the lock pawls 5 of the latch lever 6 are inserted into and engaged with the arbitrary fit holes 7 of the lock plate 8, support the root portion side and leading end side of the lock pawls 5 in front of and behind the lock plate 8.

And, in the upper rail 2, as shown in FIG. 2, there is also formed a cutout portion 16 in such a manner that it straddles over one side wall and upper wall; and, the input arm 12 of the latch lever 6 projects through the cutout portion 16 externally of the upper rail 2. On the other hand, as shown in FIG. 1, on the outer surface of the upper rail 2, there is mounted a holder 17 through a bracket (not shown) in such a manner that it may be swung in the vertical direction; and, on the holder 17, there is supported the base end of an operation lever 18 which is used to remove the locked state of the upper rail 2. The holder 17 includes an operation piece 17*a* to be engaged with the input arm 12 of the latch lever 6, whereby, when the operation lever 18 is operated and swung in the upward direction, the latch lever 6 may be operated and rotated in the locking removal direction. Specifically, when the operation lever 18 is operated and rotated upwardly, the operation piece 17*a* presses down the input arm 12 downwardly, with the result that the latch lever 6 is operated and rotated in the direction to pull the lock pawls 5 from the fit holes against the energizing force of the rod-shaped spring 9.

Figure 3:
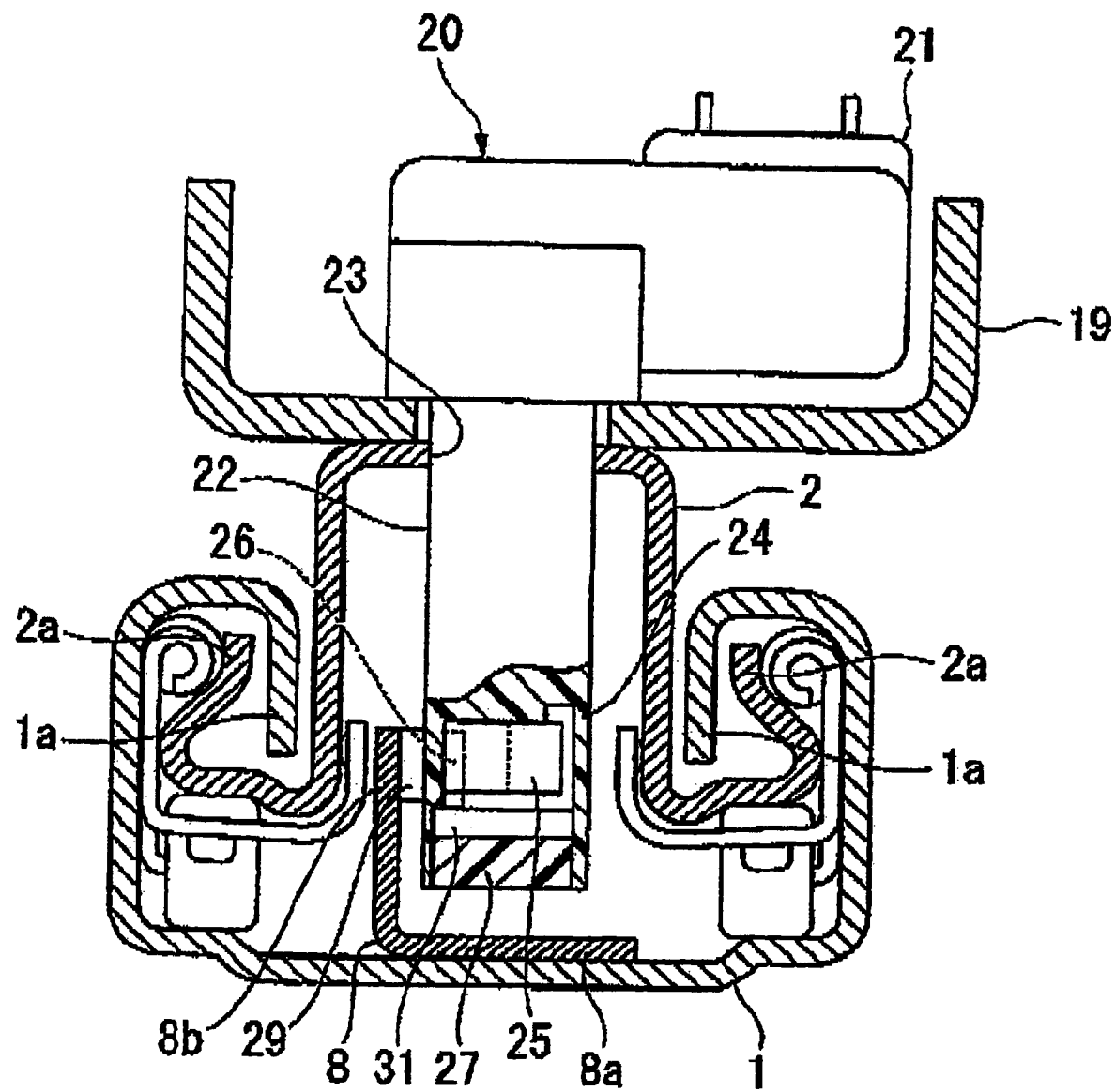
FIG. 3 is a section view taken along the B-B line shown in FIG. 1.
Figure 4:
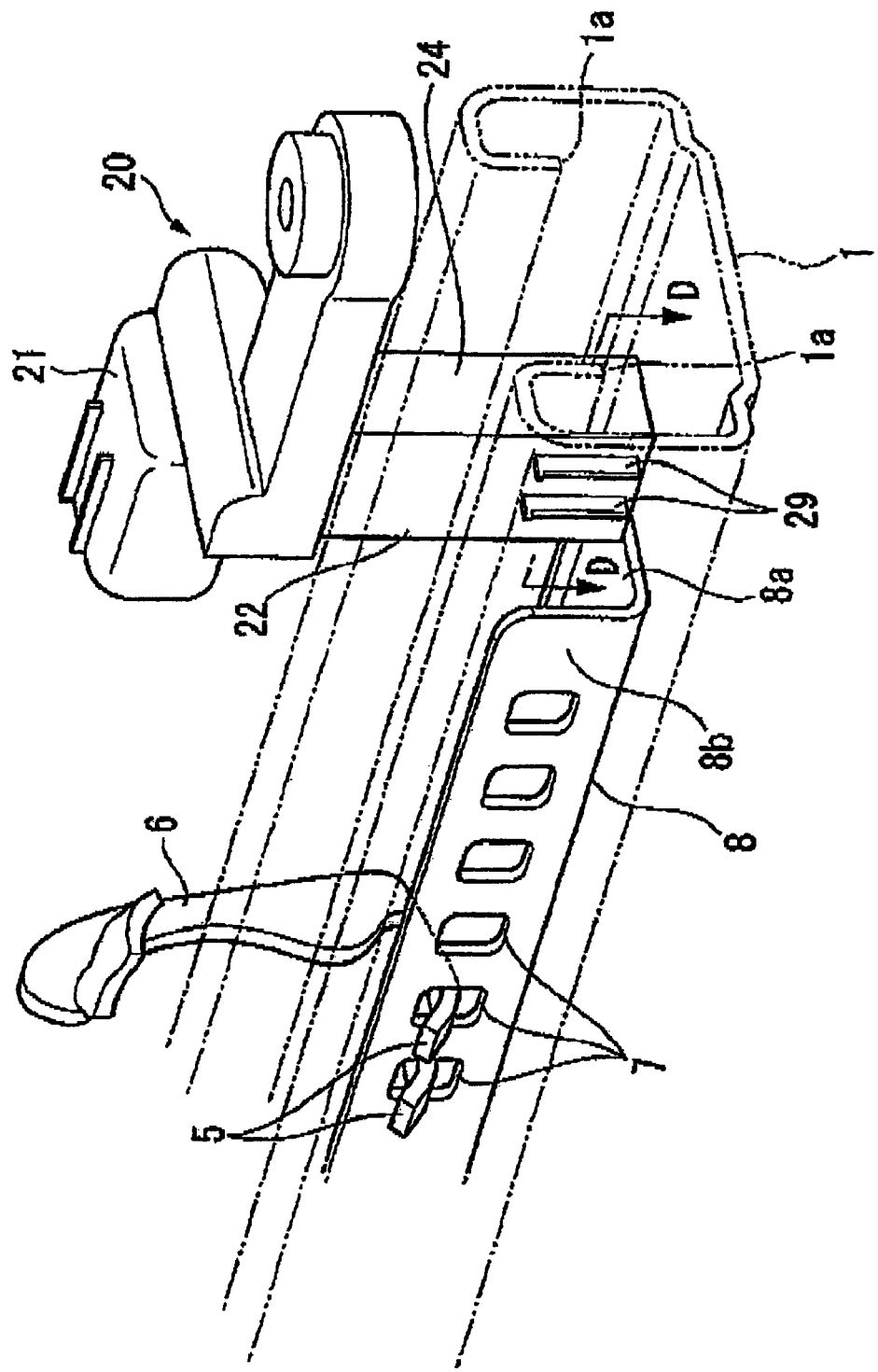
FIG. 4 is a perspective view corresponding to the arrow line C shown in FIG. 1.
Figure 5:
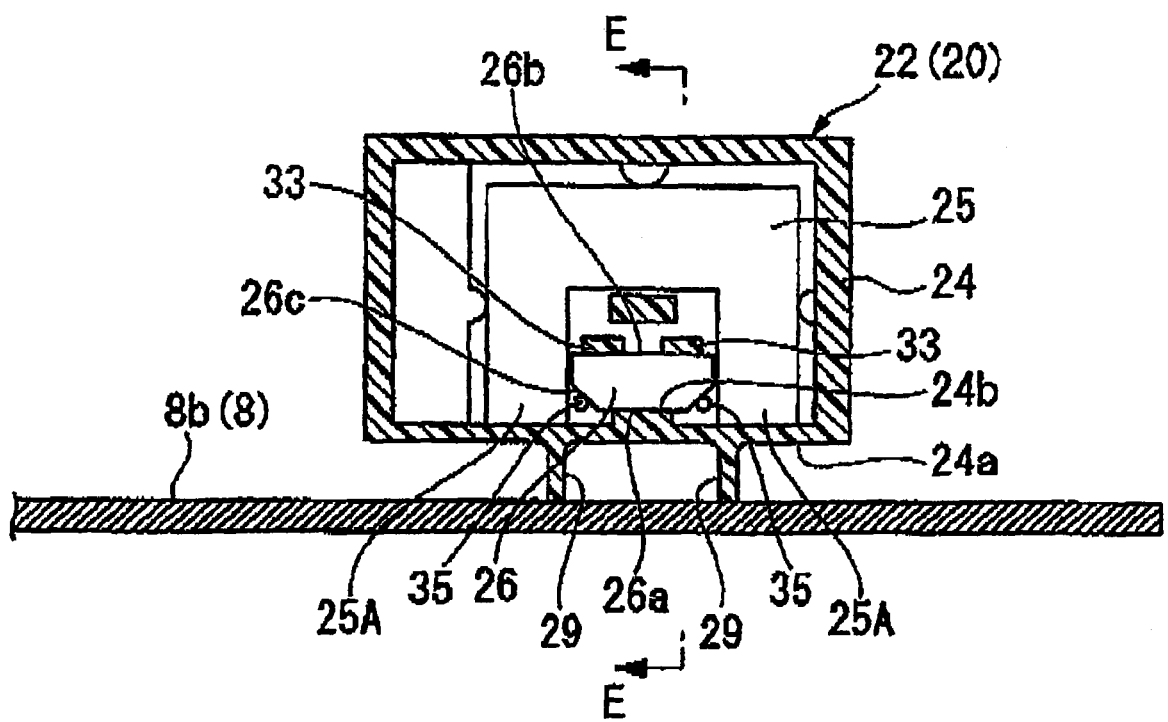
FIG. 5 is an enlarged section view taken along the D-D line shown in FIG. 4.
Figure 7:
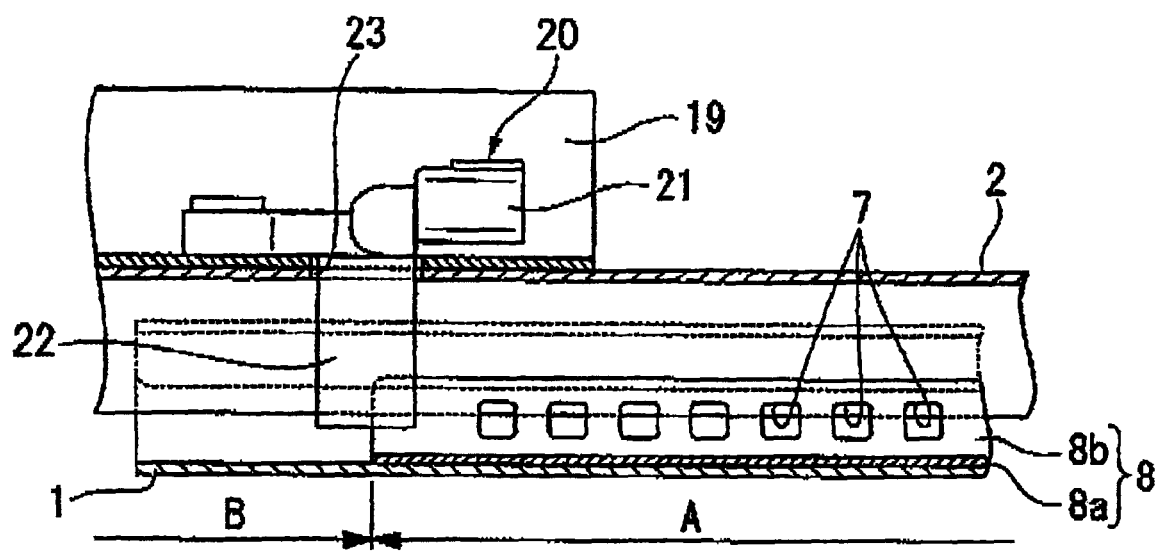
FIG. 7 is a section view taken along the F-F line shown in FIG. 1.

Here, at the position of the upper wall of the upper rail 2 that exists on the more forward side of the vehicle body than the lock mechanism 4, there is mounted a proximity sensor 20 of a magnetic field detect type through a bracket 19 shown in FIGS. 3 and 7. By the way, in FIG. 1, the illustration of the bracket 19 is omitted.

The proximity sensor 20 includes a terminal block 21 used to connect the wiring connector of an electric system, and a sensor block 22 which has a rectangular section and extends in a direction substantially perpendicular to the terminal block 21. And, the sensor block 22 is disposed inside the upper rail 2 through a penetration hole 23 formed in the upper wall of the upper rail 2.

The sensor block 22 includes a housing 24 made of a non-magnetic and elastic resin material and, as shown in FIGS. 3 through 6, in the interior of the housing 24, there are stored a substantially U-shaped permanent magnet 25 serving as a magnetic field generating portion and a Hall IC 26 serving as a detect portion for detecting a magnetic field. More specifically, the Hall IC 26 is soldered onto a PCB 31, the permanent magnet 25 and Hall IC 26 (PCB 31) are mounted into the housing 24 through an opening formed in the lower end thereof, and this opening is closed by a potting material 27 (see FIG. 3). Here, the Hall IC 26 is a tip which includes a detection surface 26*a* and a surface to be detected 26*b* formed parallel to each other when they are viewed from above; the corner portion of the tip on the detection surface 26*a* side thereof is chamfered to thereby form a slanting surface 26*c*; and, the width of the detection surface 26*a* is set smaller than the width of the surface to be detected 26*b*.

In the sensor block 22, the direction of the respective leading ends of a pair of leg portions 25A and 25A included in the substantially U-shaped permanent magnet 25 is used as the detect direction of the sensor block 22; and, the side wall 24*a* of the housing 24 disposed in front of the two leg portions 25A and 25A is disposed to face the vertical wall 8b of the lock plate 8 while it exists close to the vertical wall 8b. However, the vertical wall 8b of the lock plate 8, as shown in FIG. 7, exists only in an area A in the rear of an area B which exists on the front end side of the lower rail 1 and, therefore, only when the sensor block 22 exists in the area A, the sensor block 22 is allowed to face the vertical wall 8b. The lock plate 8 is made of a magnetic metal and may be used as the object to be detected by the proximity sensor 20.

Figure 6:
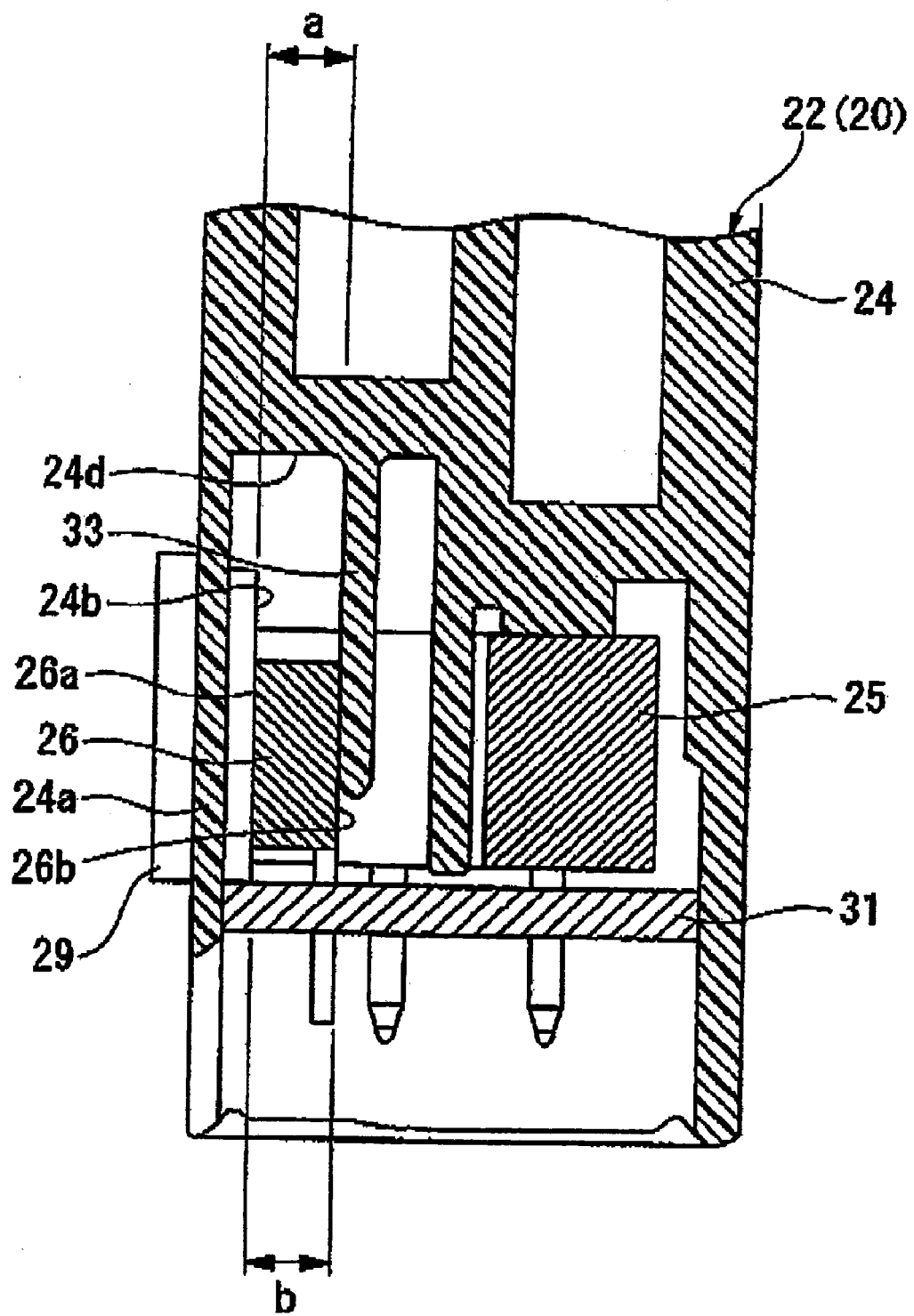
FIG. 6 is an enlarged section view taken along the E-E line shown in FIG. 5.

Here, as shown in FIG. 6, in the housing 24, there is provided a rib 33 integrally therewith which is used to apply the force the Hall IC 26 toward the lock plate 8. The rib 33 is two pawl-shaped ribs which are parallel to each other and respectively hang down from the upper wall inner surface 24d side of the housing 24, and also which may be contacted with the non-detection surface 26b of the Hall IC 26. Also, the detection surface 26a of the Hall IC 26 is pressed against the ribs 33 and is thereby contacted with the inner surface 24b of the housing 24. Specifically, the ribs 33 are formed such that a distance a between the inner surface 24b of the housing 24 and ribs 33 is set smaller than a dimension b from the detection surface 26a of the Hall IC 26 to the non-detection surface 26b thereof. Also, the two ribs 33 are respectively to be contacted with the non-detection surface 26b at positions equally distant from their respective centers in the lateral direction (in the back and forth direction of the vehicle), thereby energizing the Hall IC 26 equally toward the detection surface 26a. Here, the inner surface 24b of the housing 24 is a surface which faces the Hall IC 26 in the portion thereof that projects beyond the side wall 24a when the housing 24 is viewed from above. Also, in FIG. 6, the illustration of the potting material 27 is omitted.

According to this structure, when the Hall IC 26 is mounted into the housing 24, the Hall IC 26 is applied the force by the ribs 33, whereby the detection surface 26a of the Hall IC 26 is always contacted with the inner surface 24b of the housing 24. Also, on the housing 24, there are provided two second ribs 35 which may be contacted with the slanting surface 26c of the Hall IC 26 to thereby restrict the position shift of the Hall IC 26 in the lateral direction (in the vehicle back and forth direction). By the way, the second ribs 35 may also be omitted.

Next, description will be given below of the detect principles of the proximity sensor 20 according to the present embodiment with reference to FIG. 8.

The substantially U-shaped permanent magnet 25 includes first and second magnet pieces 25a and 25b equal in length to each other, and a third magnet piece 25c which is interposed between the first and second magnet pieces 25a and 25b and is formed shorter than the two magnet pieces 25a and 25b. The magnetic pieces 25a, 25b and 25c are connected to each other in such a manner that the same magnetic poles thereof face in the same direction.

Figure 8A:
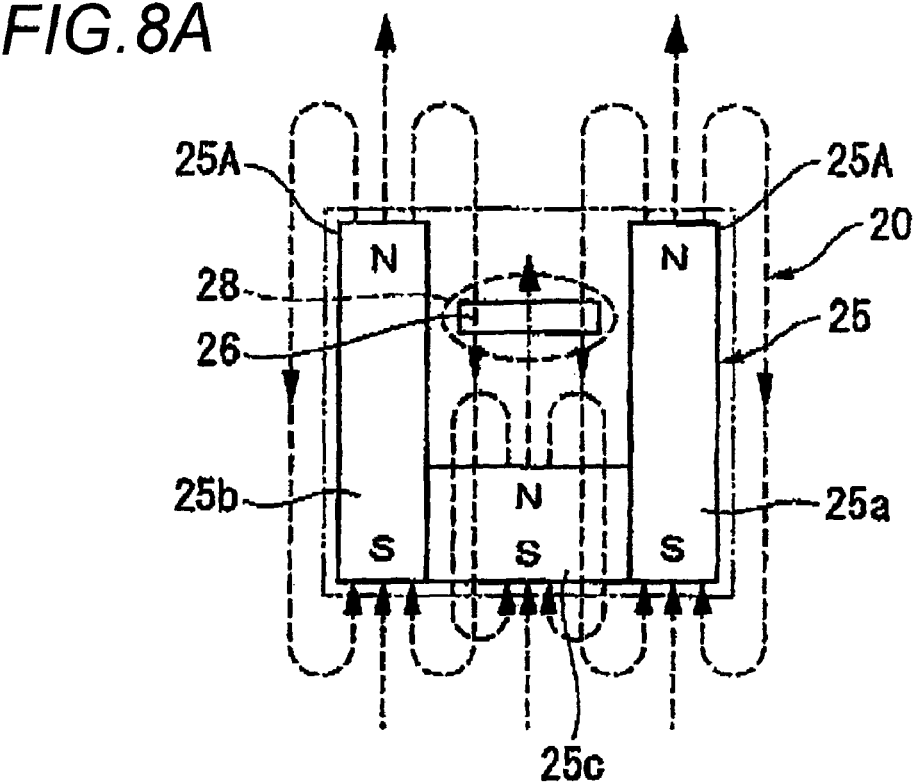
FIG. 8A is a view to show the principle of a proximity sensor according to the embodiment of the invention.
Figure 8B:
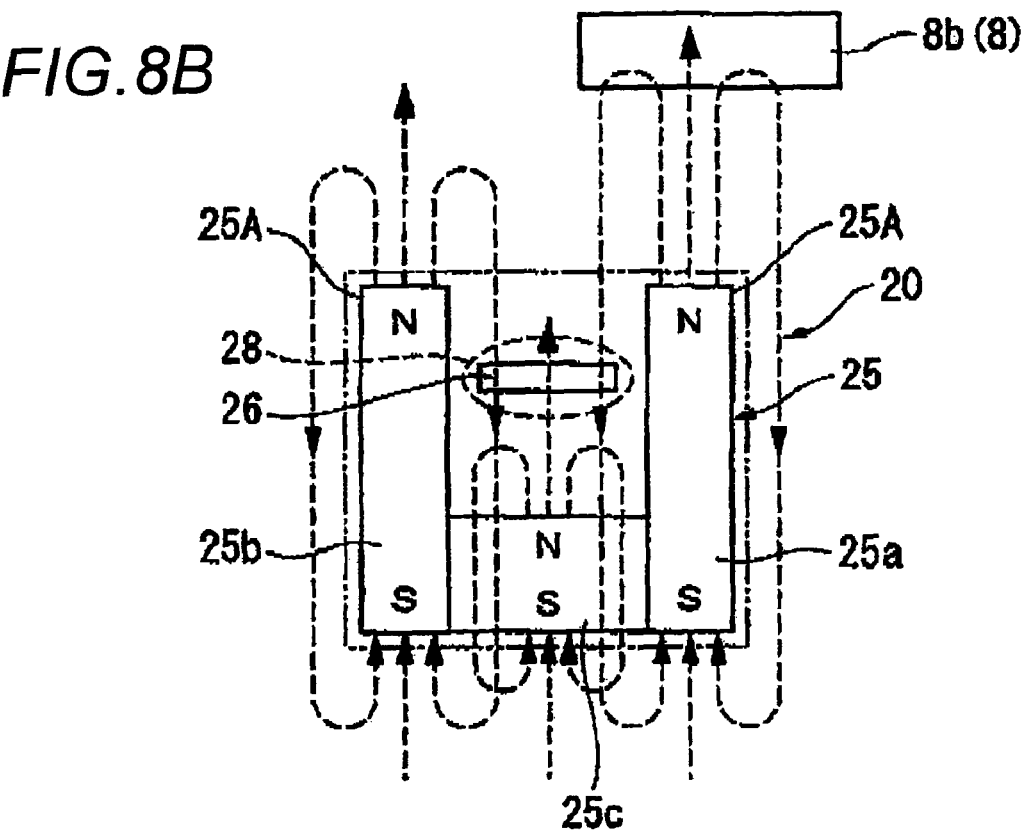
FIG. 8B is a view to show the principle of a proximity sensor according to the embodiment of the invention.

In this manner, in the substantially U-shaped permanent magnet 25, at a position shown in FIGS. 8A and 8B and existing between the leg portions 25A and 25A, a magnetic field provided by the first and second magnetic pieces 25a and 25b and a magnetic field provided by the third magnetic piece 25c cancel each other, whereby a total magnetic field becomes zero. The Hall IC 26 is disposed in a magnetic field zero area 28 intervening between the leg portions 25A and 25A. However, a state, where the total magnetic field becomes zero, may occur only when the magnetic field of the permanent magnet 25 is not influenced by an external magnetic member. For example, as shown in FIG. 8(B), when the leading end side of the leg portion 25A comes close to the lock plate 8 (vertical wall 8b) which is a magnetic member, a magnetic field acting on the Hall IC 26 increases.

Therefore, according to the present proximity sensor 20, the Hall IC 26 outputs different detect signals between when the leg portion 25A of the permanent magnet 25 is close to the lock plate 8 and when the former is distant from the latter, thereby being able to detect the slide position of the seat, that is, whether the seat exists on the front end side or on the rear side.

Also, on the surface of the housing 24 that is opposed to the vertical wall 8b of the lock plate 8, there are provided a pair of tongue-shaped projecting portions 29 and 29 integrally with such surface. These projections 29 are respectively formed on the front sides of the two leg portions of the permanent magnet 25 over a range of substantially the same height. The projecting height of the respective projecting portions 29 toward the vertical wall 8b direction is set larger than a spacing width between the housing 24 of the proximity sensor 20 and the vertical wall 8b of the lock plate 8 and, when the proximity sensor 20 exists at a position facing the vertical wall 8b, the leading end sides of the projecting portions 29 are flexed and thus contacted with the vertical wall 8b.

Thus, even if there are small magnetic materials such as a screw, a washer and a stapler in the periphery of the proximity sensor 20, the projecting portions 29 may positively prevent the magnetic material from approaching the vicinity of the leg portions 25A of the permanent magnet 25. Therefore, there may be eliminated a possibility that the small magnetic material existing in the periphery of the proximate sensor 20 may have an ill influence on the detect results of the proximate sensor 20, which may enhance the accuracy of the position detection of the seat. Also, even when the seat exists at the front end position, because the proximity sensor 20 includes the projecting portions 29 made of a non-magnetic material, it is possible to prevent small magnetic materials from approaching the proximity sensor 20 regardless of the positions of the seat.

In the above-mentioned structure, when adjusting the back and forth position of the seat, a driver may pull up the operation lever 18 upwardly, whereby the lock pawls 5 of the latch lever 6 are pulled out of the fit holes 7 of the lock plate 8 and, in this state, the seat may be slid and adjusted to an arbitrary back and forth position thereof. After then, when the pulled-up state of the operation lever 18 is removed, the latch lever 6 is applied the force again by the rod-shaped spring 9, whereby the lock pawls 5 are inserted into and engaged with their corresponding fit holes 7 of the lock plate 8.

The back and forth position of the seat is adjusted in this manner. On the other hand, when the seat is situated at a position backwardly of the front end position, the proximity sensor 20 is disposed opposed to the vertical wall 8b of the lock plate 8 in the area A in FIG. 7, and the Hall IC 26 of the proximity sensor 20 outputs to a controller (not shown) a current signal to the effect that the seat is situated at the other position than the front end position.

Also, when the seat is situated at the front end position, the proximity sensor 20 is situated in the area B in FIG. 7 where it is not opposed to the vertical wall 8b, and the Hall IC 26 of the proximity sensor 20 outputs to the controller (not shown) a current signal to the effect that the seat is situated at the front end position.

Here, since the Hall IC 26 is fixed in position such that it is always pressed against the inner surface 24b of the housing 24, a distance between the Hall IC 26 and lock plate 8 may always be maintained constant. Therefore, the position of the proximity sensor 20 may be detected with high accuracy without detecting the wrong position.

According to the present embodiment, in the proximity sensor 20 for detecting the proximity of the lock plate 8 made of a magnetic member using the Hall IC 26, there are provided the ribs 33 that may apply the force the Hall IC 26 toward the detection surface 26 of the Hall IC 26 elastically.

Thanks to this structure, the Hall IC 26 may always be applied the force toward the detection surface 26a thereof using the ribs 33, thereby being able to maintain constant the distance between the detection surface 26a of the Hall IC 26 and lock plate 8. This may enhance the detect accuracy of the proximity sensor 20. Owing to this, the developing output of the air bag and the ignition timing of the inflator may be realized as designed.

Also, there is provided the housing 24 for storing the Hall IC 26 therein. The Hall IC 26 is held by and between the inner surface 24b of the housing 24 and ribs 33.

Owing to this structure, the Hall IC 26 may be fixed between the inner surface 24b and ribs 33, thereby being able to maintain the distance between the detection surface 26a of the Hall IC 26 and lock plate 8 further positively. Therefore, since the relative position between the housing 24 and Hall IC 26 is kept stationary, the detect accuracy of the proximity sensor 20 may be enhanced without receiving ill influences such as the shifted position of the Hall IC 26 that may occur due to vibrations caused when the vehicle runs.

Further, the detection surface 26a of the Hall IC 26 and the non-detection surface 26b disposed opposed to the detection surface 26a are arranged substantially parallel to each other, and the distance a between the inner surface 24b of the housing 24 and ribs 33 is set smaller than the dimension b between the detection surface 26a and non-detection surface 26b of the Hall IC 26.

Owing to this structure, when mounting the Hall IC 26 onto the housing 24, since the Hall IC 26 is mounted in such a manner that it is pushed into between the inner surface 24b of the housing 24 and ribs 33, the ribs 33 are allowed to function positively, which makes it possible to hold the Hall IC 26 between the inner surface 24a of the housing 24 and ribs 33. Therefore, the positioning of the Hall IC 26 may be carried out positively and easily.

And, the ribs 33 are formed integrally with the housing 24 for storing the Hall IC 26 therein.

Owing to this structure, simultaneously when the housing 24 is formed, the ribs 33 are also formed, which makes it possible to form them easily without taking time and labor.

The technical range of the invention is not limited to the above-mentioned embodiment but contains various changes of the above-mentioned embodiment without departing from the scope of the subject matter of the invention. That is, the specific structures and materials used in the embodiment are only examples and thus they may be changed or modified properly.

For example, although description has been given heretofore of the seat position detecting apparatus for use in a vehicle in the present embodiment, a similar structure may also be applied to other position detecting apparatus than the seat position detect apparatus.

Also, in the present embodiment, the proximity sensor is disposed on the side of the upper rail used as a movable member and a magnetic member serving as a member to be detected is disposed on the side of the lower rail. However, reversely, the proximity sensor may be disposed on the lower rail side and the magnetic member serving as the member to be detected may be disposed on the upper rail side.

What is claimed is:

1. A proximity sensor that detects a proximity of a detected object made of magnetic material, the proximity sensor comprising:
    a magnetic detection element including a detection surface that faces toward the detected object, a non-detection surface that is opposite the detection surface and faces away from the detected object, and a pair of slanting surfaces that are chamfered at both corner portions of the detection surface in a width direction;
    a housing that receives the magnetic detection element, said housing including a pair of first ribs laterally spaced from one another that separately and elastically apply force to the non-detection surface of the magnetic detection element to urge the detection surface toward the detected object, and a pair of second ribs that are contacted with the pair of the slanting surfaces.

2. The proximity sensor according to claim 1,
    wherein the magnetic detection element is held by and between an inner surface of the housing and the pair of first ribs.

3. The proximity sensor according to claim 2, wherein the detection surface of the magnetic detection element and the non-detection surface of the magnetic detection element are substantially parallel to each other, and
    a distance from the inner surface of the housing to the pair of first ribs is set smaller than a dimension between the detection surface and the non-detection surface.

4. The proximity sensor according to claim 2, wherein the pair of first ribs are integrally formed with the housing.

5. The proximity sensor according to claim 1, wherein in an inner surface of the housing, a portion which is contacted with the detection surface is projected and formed thicker than peripheral portions.

6. The proximity sensor according to claim 1, wherein the housing houses a U-shaped permanent magnet including a pair of leg portions.

7. The proximity sensor according to claim 6, wherein the pair of first ribs and the pair of second ribs are provided between the pair of leg portions.

8. A proximity sensor that detects a proximity of a detected object made of magnetic material, the proximity sensor comprising:
    a magnetic detection element including a detection surface that faces toward the detected object, a non-detection surface that is opposite to the detection surface and faces away from the detection object, and a pair of slanting surfaces that are chamfered at both of corner portions of the detection surface in a width direction;
    a housing that receives the magnetic detection element, said housing including a first rib that elastically applies force to the non-detection surface of the magnetic detection element to urge the detection surface toward the detected object, and a pair of second ribs that are contacted with the pair of the slanting surfaces.

9. The proximity sensor according to claim 8,
    wherein the magnetic detection element is held by and between an inner surface of the housing and the first rib.

10. The proximity sensor according to claim 9, wherein the detection surface of the magnetic detection element and the non-detection surface of the magnetic detection element are substantially parallel to each other, and
    a distance from the inner surface of the housing to the first rib is set smaller than a dimension between the detection surface and the non-detection surface.

11. The proximity sensor according to claim 9, wherein the first rib is integrally formed with the housing.

12. The proximity sensor according to claim 8, wherein, in the inner surface of the housing, a portion which is contacted with the detection surface is projected and formed thicker than peripheral portions.

13. The proximity sensor according to claim 8, wherein the housing houses a U-shaped permanent magnet including a pair of leg portions.

14. The proximity sensor according to claim 13, the first rib and the pair of second ribs are provided between the pair of leg portions.

15. The proximity sensor according to claim 13, wherein the pair of leg portions of the permanent magnet are connected by a connecting portion and the pair of leg portions extend from the connecting portion in a first direction.

16. The proximity sensor according to claim 8, the housing further including an upper wall inner surface facing toward the magnetic detection element, wherein the first rib extends from the upper wall inner surface toward the magnetic detection element.

17. The proximity sensor according to claim 16, further including a printed circuit board that is situated so that the magnetic detection element is between the printed circuit board and the upper wall inner surface of the housing, wherein the magnetic detection element is connected to the printed circuit board with solder.

* * * * *